(12) United States Patent
Wang et al.

(10) Patent No.: US 7,175,286 B1
(45) Date of Patent: *Feb. 13, 2007

(54) KEYSTONE CORRECTION DERIVED FROM THE PARAMETERS OF PROJECTORS

(75) Inventors: Zhongde Wang, Camas, WA (US); Tianbing Brian Teng, Beaverton, OR (US)

(73) Assignee: Pixelworks, Inc., Tualatin, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/291,161

(22) Filed: Nov. 30, 2005

Related U.S. Application Data

(63) Continuation of application No. 10/849,998, filed on May 19, 2004, now Pat. No. 6,997,563.

(51) Int. Cl.
*G03B 21/00* (2006.01)
*G03B 21/14* (2006.01)

(52) U.S. Cl. .................................. 353/70
(58) Field of Classification Search .......... 353/69, 353/70; 348/745, 806
See application file for complete search history.

(56) References Cited

U.S. PATENT DOCUMENTS

| | | | |
|---|---|---|---|
| 5,355,188 A | 10/1994 | Biles et al. | |
| 5,720,539 A | 2/1998 | Woo | |
| 6,305,805 B1 | 10/2001 | Liebenow | 353/69 |
| 6,339,434 B1 | 1/2002 | West et al. | |
| 6,367,933 B1 | 4/2002 | Chen et al. | 353/69 |
| 6,520,547 B2 | 2/2003 | Robinson | |
| 6,520,646 B2 | 2/2003 | Rodriguez et al. | |
| 6,520,647 B2 | 2/2003 | Raskar | |
| 6,592,228 B1 | 7/2003 | Kawashima et al. | 353/69 |
| 6,611,260 B1 | 8/2003 | Greenberg et al. | |
| 6,686,973 B2 | 2/2004 | Su | 348/745 |
| 6,793,347 B2 | 9/2004 | Morishita | |
| 6,836,298 B2 | 12/2004 | Song et al. | |
| 6,843,563 B2 | 1/2005 | Richardson | |
| 6,846,081 B2 | 1/2005 | Mochizuki et al. | 353/70 |
| 6,867,753 B2 | 3/2005 | Chinthammit et al. | |
| 6,877,863 B2 | 4/2005 | Wood et al. | |
| 6,962,417 B1 | 11/2005 | Teng et al. | |
| 6,974,217 B2 * | 12/2005 | Kimura et al. | 353/69 |
| 6,997,563 B1 * | 2/2006 | Wang et al. | 353/70 |
| 2002/0063726 A1 | 5/2002 | Jouppi | |
| 2002/0109668 A1 | 8/2002 | Rosenberg et al. | |
| 2003/0234797 A1 | 12/2003 | Williams et al. | |
| 2004/0036844 A1 | 2/2004 | Wood et al. | 353/70 |
| 2004/0095317 A1 | 5/2004 | Zhang et al. | |

* cited by examiner

*Primary Examiner*—Christopher Mahoney
(74) *Attorney, Agent, or Firm*—Marger Johnson & McCollom, P.C.

(57) ABSTRACT

A projector determines horizontal and vertical tilt angles. Using the tilt angles and the inherent properties of the projector, keystone correction corner points for the image can be computed. The keystone correction corner points can be used to perform keystone correction on the image.

28 Claims, 7 Drawing Sheets

KEYSTONE CORRECTION DERIVED FROM THE PARAMETERS OF PROJECTORS

This application is a continuation of U.S. patent application Ser. No. 10/849,998, filed May 19, 2004, now U.S. Pat. No. 6,997,563, and is incorporated herein by reference for all intents and purposes.

FIELD OF THE INVENTION

This invention pertains to projectors, and more particularly to correcting distortion in a projected image.

BACKGROUND OF THE INVENTION

Projectors have been around for quite some time. Historically, they projected only static images. The image to be projected would be placed a horizontal surface above a light source. Mirrors would then reflect the image onto a vertical surface parallel to the front of the projector, for easy viewing. The image could be raised or lowered by changing the angle of the mirror, and could be focused by raising or lowering the mirror (thereby changing the focal length of the projector).

With the advent of computers, manufacturers realized that projectors might be able to project dynamic (that is, changing) images. The first ventures in this area relied separate boxes that were placed on top of the light source, where the static images would have been placed. The computer was then responsible for changing the image in the box; the projector would show dynamic images by virtue of its light and mirror system.

Eventually, projector manufacturers realized that the two pieces could be combined. The projectors could connect directly to the computer and place the dynamic images directly in front of the light source, without requiring separate equipment. Projectors eventually moved from indirect (that is, reflected) projection systems to direct projection systems, where the image is oriented vertically, in a plane parallel to the projection surface.

But all of these systems suffered from a common problem. They all expect that the image, as projected, will be shown on a surface that is parallel to the front face of the projector. If the surface onto which the image is projected is not parallel to the front face of the projector, the image is distorted.

Various improvements to projectors have been made, to attempt to address this problem. For example, U.S. Pat. Nos. 6,520,547, 6,367,933, 6,305,805, and 6,339,434 each attempt to solve the problem. But each of these patents fails to completely solve the problem. U.S. Pat. No. 6,520,547, which uses 3×3 rotation matrices, does not work in a digital environment. U.S. Pat. No. 6,367,933 assumes that the optical axis of the projector is centered relative to the projected image, which is not usually the case. U.S. Pat. No. 6,305,805 warps the image by adding or deleting pixels, which is not an acceptable practice. And U.S. Pat. No. 6,339,434 only describes a scaling system in general.

Accordingly, a need remains for a way to correct for image distortion that addresses these and other problems associated with the prior art.

DETAILED DESCRIPTION OF THE PREFERRED EMBODIMENT

Figure 1:
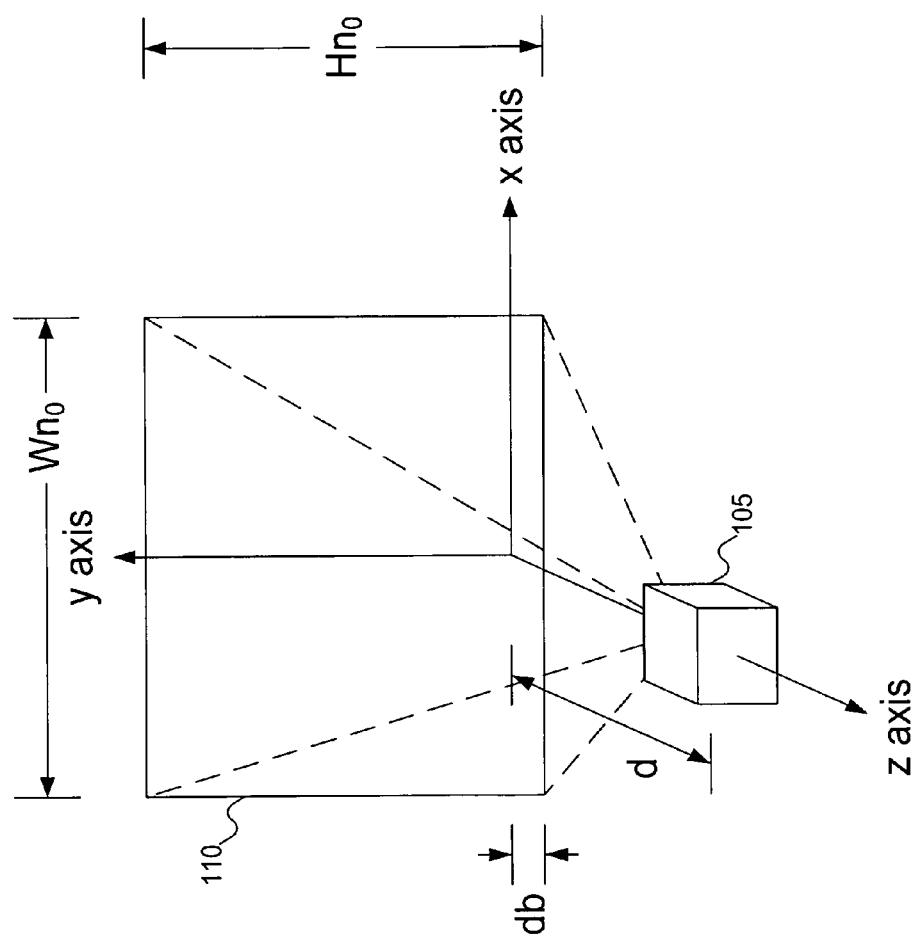
FIG. 1 shows the inherent parameters of a projector.

FIG. 1 shows the inherent parameters of a projector. In FIG. 1, projector 105 is shown projecting image 110. Image 110 is projected onto a surface (not shown). Under ideal circumstances, image 110 is projected onto the projection surface in such a way that, without correction, image 110 is perfectly rectangular. A coordinate system can be superimposed in the space, with the image in the XY-plane and projector 105 along the Z-axis, as shown in FIG. 1. The Z-axis is also called the normal projection line (NPL).

In a preferred embodiment, the coordinate axes are positioned so that the Y-axis divides image 110 into two equal portions. That is, half of image 110 is to the left of the Y-axis, and half of image 110 is to the right of the Y-axis. But a person skilled in the art will recognize that this is not required, and that the image can be projected in a different spatial position than that shown in FIG. 1 (with image 110 still lying in the XY-plane).

Projector 105 projects images that have a width and height. A person skilled in the art will recognize that the projected images can be resized by moving projector 105 closer to (or further from) the projection surface (with possibly some refocusing of the projected image). When the projected image is so enlarged or shrunk, it is scaled: that is, everything grows or shrinks proportionately.

When projector 105 is positioned a specific distance d along the Z-axis, image 110 has a width $Wn_0$ and a height $Hn_0$. d, $Wn_0$, and $Hn_0$ are three inherent parameters of projector 105. Under these circumstances, image 110 is said to be in nominal position. Note that, as mentioned above, projector 105 can be moved along the Z-axis, increasing or decreasing the distance d and changing the dimensions of image 110. Mathematically, for any other distance $d_1$, the dimensions of image 110 can be computed, and these alternative values for d, $Wn_0$, and $Hn_0$ could be used.

The fourth parameter of projector 105 is db. db measures the distance from the NPL to the bottom of image 110. Although FIG. 1 shows NPL to intersect image 110 somewhere inside image 110, a person skilled in the art will recognize that this is not required. That is, NPL could intersect the XY-plane outside image 110: for example, below image 110 or above image 110.

Figure 2:
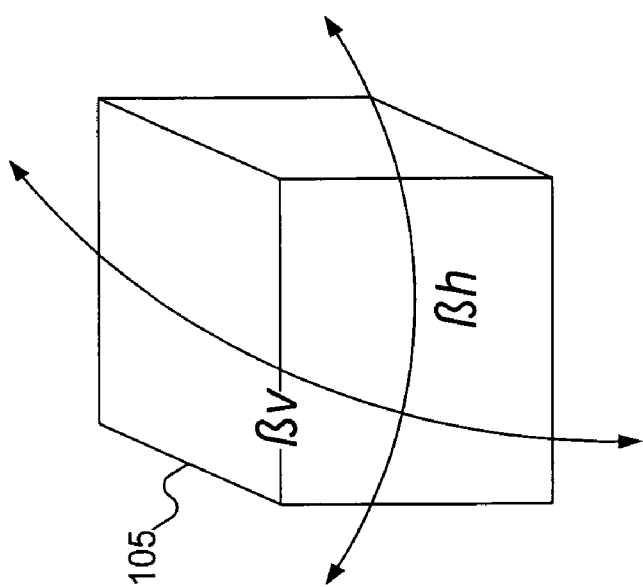
FIG. 2 shows the projector FIG. 1 undergoing rotation through two tilt angles.

FIG. 2 shows the projector FIG. 1 undergoing rotation through two tilt angles. In FIG. 2, projector 105 is shown undergoing rotation through the horizontal plane (not shown in FIG. 2, but with reference back to FIG. 1, this is the XZ-plane). Projector 105 is being rotated through the horizontal plane a horizontal tilt angle βh. Similarly, projector 105 is being rotated through a vertical plane (specifically, the YZ-plane) through a vertical tilt angle βv.

Figure 3A:
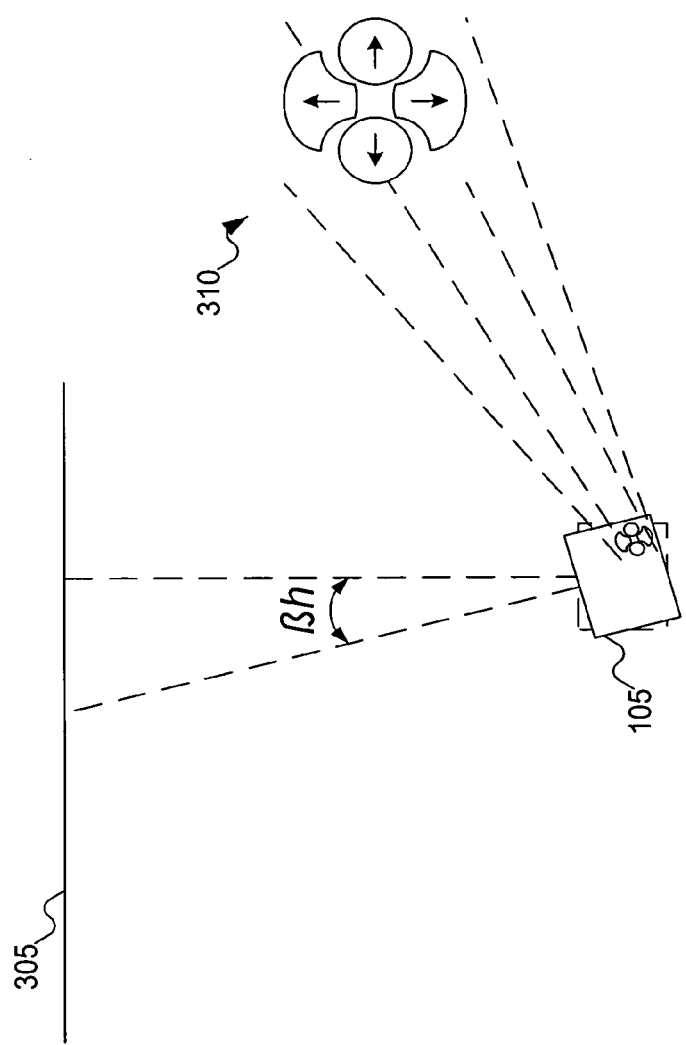
FIGS. 3A–3B show the tilt angles of the projector of FIG. 1 relative to a projection surface.
Figure 3B:
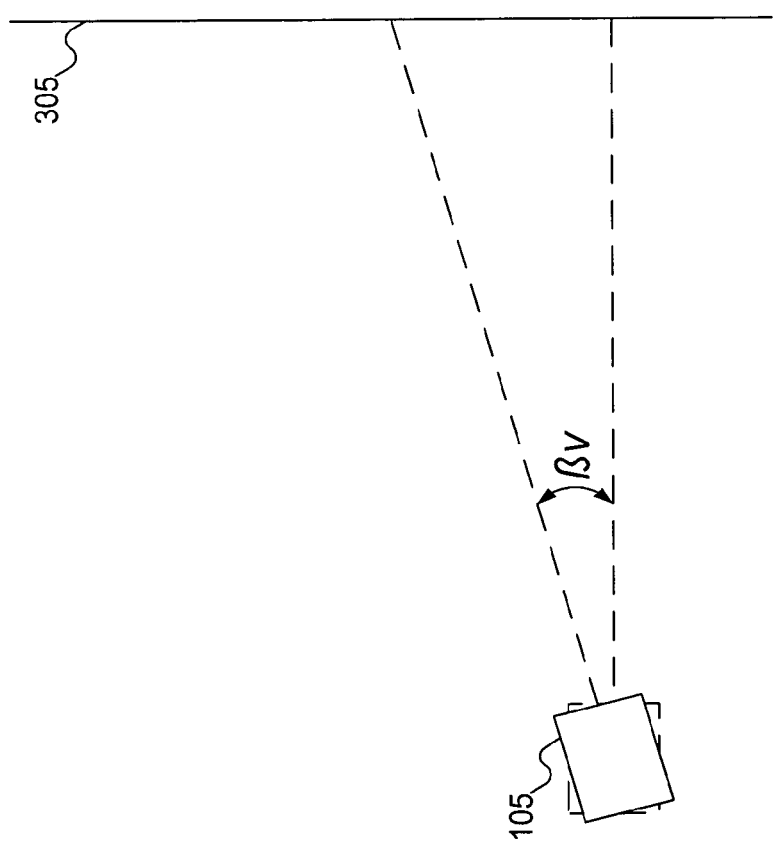

FIGS. 3A–3B show the tilt angles of the projector of FIG. 1 relative to a projection surface. In FIG. 3A, projector 105 has been rotated through an angle βh in the horizontal plane relative to projection surface 305. As can been seen, the axis of projection of projector 105 is no longer normal to projection surface 305. As a result, the image projected on projection surface 305 will be deformed. The right side of projection surface 305 will be closer to projector 105 than the left side of projection surface 305.

FIG. 3A also shows buttons 310. Buttons 310 can be used to receive input from a user of projector 105. For example, buttons 310 can be used to receive the tilt angle from the user. Although FIG. 3A shows buttons 310 positioned on the top of projector 105, a person skilled in the art will recognize the buttons 310 can be positioned in other locations on projector 105, and even disconnected from projector 105: for example, on a remote controlled (not pictured). Buttons 310 are discussed further with reference to FIG. 4 below.

Similar to FIG. 3A, in FIG. 3B projector 105 has been rotated through the vertical YZ-plane, so that it is angled relative to projection surface 305. The image will be deformed, with the bottom of projection surface 305 closer to projector 105 than the top of projection surface 305.

Figure 4:
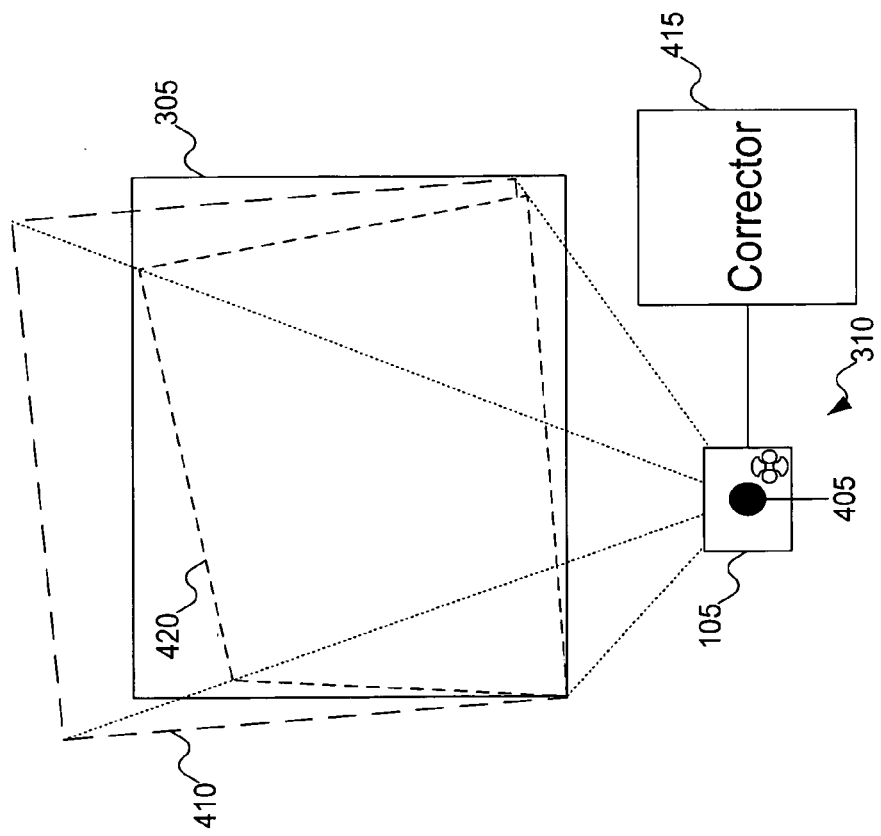
FIG. 4 shows the projector of FIG. 1 projecting an image onto the projection surface of FIG. 3, to perform keystone correction, according to an embodiment of the invention.

FIG. 4 shows the projector of FIG. 1 projecting an image onto the projection surface of FIG. 3, to perform keystone correction, according to an embodiment of the invention. In FIG. 4, projector 105 has projection point 405, which is the point within projector 105 from which the projection emanates. In FIG. 4, rather than assuming that the projector has been rotated through horizontal and vertical tilt angles, it is assumed that the screen, on which the image is projected by projector 105, is rotated relative to projection surface 305. This image would be image 410. As should be apparent, the horizontal and vertical tilt angles of image 410 are the same as the horizontal and vertical tilt angles of projector 105: the difference is simply which frame of orientation is used.

To perform keystone correction, projector 105 uses corrector 415. Understanding how corrector 415 performs keystone correction requires starting with the basic formulae for rotation. Mathematically, rotation through a horizontal tilt angle βh in the horizontal XZ-plane changes a vector $$\begin{bmatrix} x \\ y \\ z \end{bmatrix}$$

to a new vector $$\begin{bmatrix} x' \\ y' \\ z' \end{bmatrix}$$

according to a simple formula:

$$\begin{bmatrix} x' \\ y' \\ z' \end{bmatrix} = \begin{bmatrix} \cos\beta h & \sin\beta h & 0 \\ -\sin\beta h & \cos\beta h & 0 \\ 0 & 0 & 1 \end{bmatrix} \begin{bmatrix} x \\ y \\ z \end{bmatrix}.$$

Similarly, rotation through a vertical tilt angle βv produces the equation $$\begin{bmatrix} x' \\ y' \\ z' \end{bmatrix} = \begin{bmatrix} \cos\beta v & 0 & -\sin\beta v \\ 0 & 1 & 0 \\ \sin\beta v & 0 & \cos\beta v \end{bmatrix} \begin{bmatrix} x \\ y \\ z \end{bmatrix}.$$

Using the above-described rotation matrices, the deformation of the projected image can be computed, to describe image 410. Note that image 410 is not necessarily (and in fact, unlikely to be) in the same plane as projection surface 305: image 410 simply represents the result of rotating the nominal image through the horizontal and vertical tilt angles.

Next, lines are established between the four corners of the image 410 and projection point 405. The intersection of these lines and projection surface 305 then defines the desired corners for image 420. The projected image is then (internally to projector 105) scaled so that the projected image fits within the established corners of image 420. This deformed image, when projected onto projection surface 305, then shows an undistorted image.

The procedure described with reference to FIG. 4 is enables one skilled in the art to produce equations for computing the keystone correction corner points. The mathematics is relatively straightforward, although the resulting equations are somewhat complicated. The equations are presented below without derivation:

$$xp[x, y] = \frac{\cos[\beta h] \times x}{1 + \frac{\sin[\beta v] \times y + \cos[\beta v] \times \sin[\beta h] \times x}{d}} \text{ and}$$

$$yp[x, y] = $$

$$\frac{\cos[\beta v] \times y - \sin[\beta h] \times}{1 + \frac{\sin[\beta v] \times x - \left(db - \frac{Hn_0}{2}\right)}{d^6}} + \left(db - \frac{Hn_0}{2}\right)$$

Equation Set 1

$$xp[x, y] = \frac{\cos[\beta h] \times x - \sin[\beta h] \times \sin[\beta v] \times y}{1 + \frac{\sin[\beta v] \times x - \cos[\beta h] \times \sin[\beta v] \times y}{d}} \text{ and}$$

$$yp[x, y] = $$

$$\frac{\cos[\beta v] \times y - \left(db - \frac{Hn_0}{2}\right)}{1 + \frac{\sin[\beta h] \times x + \cos[\beta h] \times \sin[\beta v] \times y}{d}} + \left(db - \frac{Hn_0}{2}\right).$$

Equation Set 2

The reader might be wondering why there are two different sets of equations provided, when both rely on the same inputs (the inherent parameters of the projector, and the horizontal and vertical tilt angles βh and βv). The reason for the two sets of equations lies in the fact that not all projectors accomplish rotations the same ways. The difference between the two equation sets lies in how the term "horizontal plane" is defined.

As shown in FIG. 1, the horizontal XZ-plane was implied to be the plane parallel to the ground and including the NPL. (For purposes of this discussion, the fact that the ground is not perfectly flat is safely ignored.) But not all projectors, in performing horizontal rotation, rotate the projector through this plane. Instead, some projectors tilt the XZ-plane at the same time that they rotate through the vertical tilt angle, and perform horizontal rotation through this rotated XZ-plane.

In case the above description was confusing, consider the following. Some projectors achieve rotation by elevating the front end of the projector: either using extendible legs, or by propping the projector, perhaps using books. This elevation accomplishes rotation through the vertical YZ-plane. To achieve rotation through the horizontal plane, the projector (along with any elevating materials) is swiveled on the table (or whatever surface the projector is resting on). In other words, the horizontal rotation is in the original XZ-plane, which was orthogonal to the projection surface. In this situation, Equation Set 1 is used.

But some projectors using a platform that can both rotate left and right and swivel up and down. Such a projector is not performing rotation in the original XZ-plane: instead, it is rotating horizontally in a tilted plane. Thus, to determine the "true" horizontal rotation (relative to the original XZ-plane) requires compensating for the fact that the projector has also been tilted vertically. In this situation, Equation Set 2 is used.

A person skilled in the art will recognize that, in fact, two equation sets are not needed. For projectors that rotate in the tilted XZ-plane, it is possible to mathematically adjust the horizontal tilt angle βh based on the vertical tilt angle βv. Then, Equation Set 1 can be used.

Once the correct equations to use have been determined (the correct equations are determined by the physical structure of the projector, and can be determined at the time of manufacture), it is a simple matter to input to the equations the coordinates of the original corner points of the image and compute the keystone correction corner points. At this point, the image can be scaled as needed to produce an undistorted image on the projection surface. The procedure by which the image is scaled is generally beyond the scope of this document, but any scaling approach compatible with keystone correction can be used.

Although the inherent parameters of projector 105 are known in advance, the horizontal and vertical tilt angles depend on the specific use of projector 105. Thus, the horizontal and vertical tilt angles βh and βv need to be determined somehow by projector 105. The most common way for projector 105 to be informed of the horizontal and vertical tilt angles is by having the user press buttons (for example, buttons 310) on projector 105. With each button press, one of the horizontal or vertical tilt angles is slightly adjusted and the keystone correction performed anew. The user can press the up and down buttons to adjust the vertical tilt angle, and can press the left and right buttons to adjust the horizontal tilt angle. The user then views the result on projection surface 305 and adjusts changes the horizontal and vertical tilt angles again, if necessary.

But there are other ways to let projector 105 know the horizontal and vertical tilt angles. For example, the user could use a keypad to enter numerical values for the angles (this assumes the user can accurately measure the angles). Or, projector 105 could determine the angles directly, perhaps using gyroscopes. For example, the user could position projector 105 in the XZ-plane, let projector 105 know it is in the initial position (perhaps by pressing a button), then rotate projector 105 into its desired position. Such a system could also account for translational movement (that is, moving projector 105 to a different location in the coordinate system). For example, if projector 105 cannot be positioned properly initially in its final location (this can occur if the final position of projector 105 is not in the XZ-plane), projector 105 can be initially positioned in one location and then relocated to its final position. Projector 105 can then determine not only its rotation but also its translational movement (accounting for translation merely requires adding or subtracting values to x, y, and/or z before performing the rest of the computation). A person skilled in the art will recognize other ways in which projector 105 can determine its horizontal and vertical tilt angles.

Figure 5A:
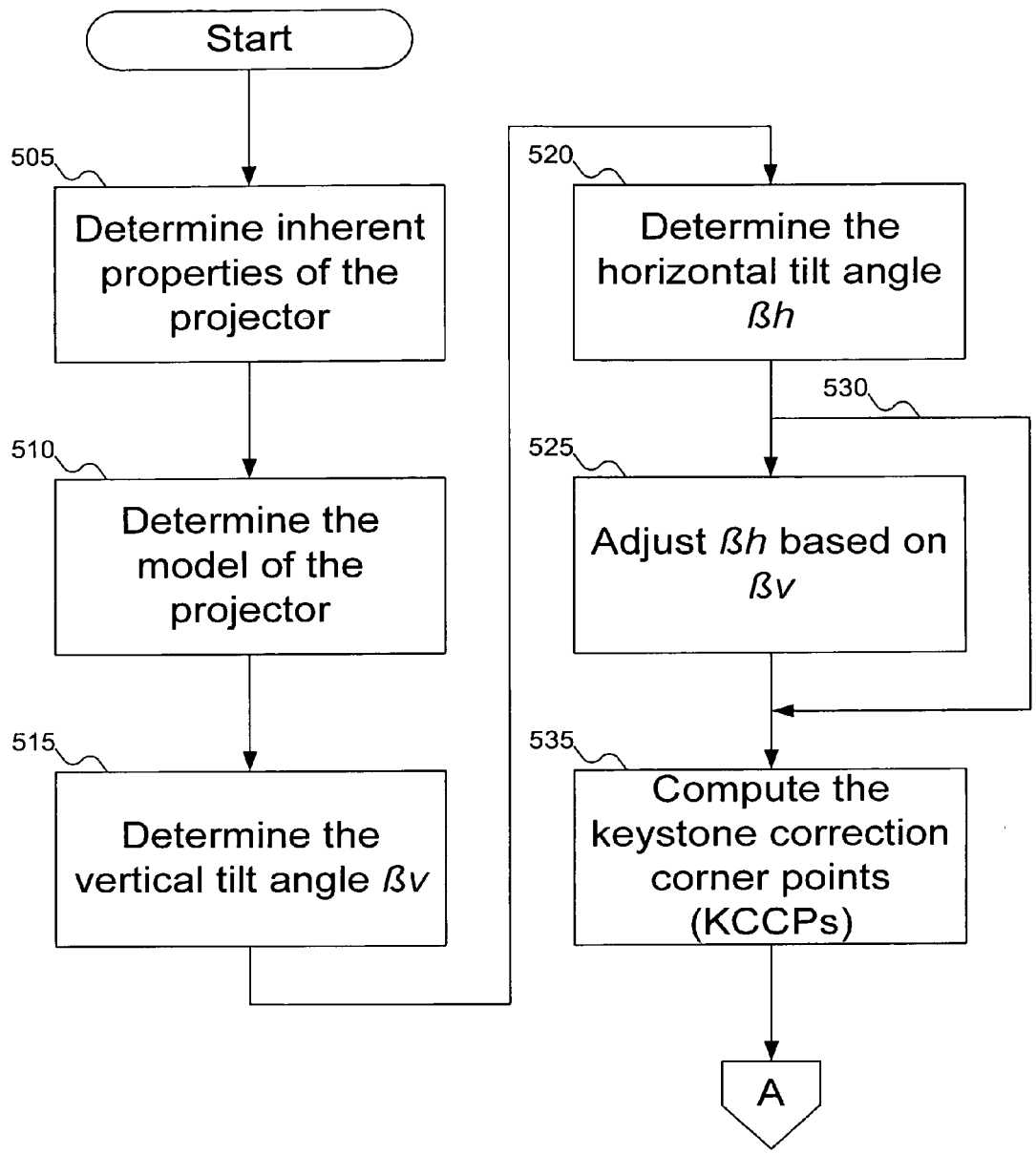
FIGS. 5A–5B show a flowchart of the procedure for performing keystone correction for the projector of FIG. 1, according to an embodiment of the invention.
Figure 5B:
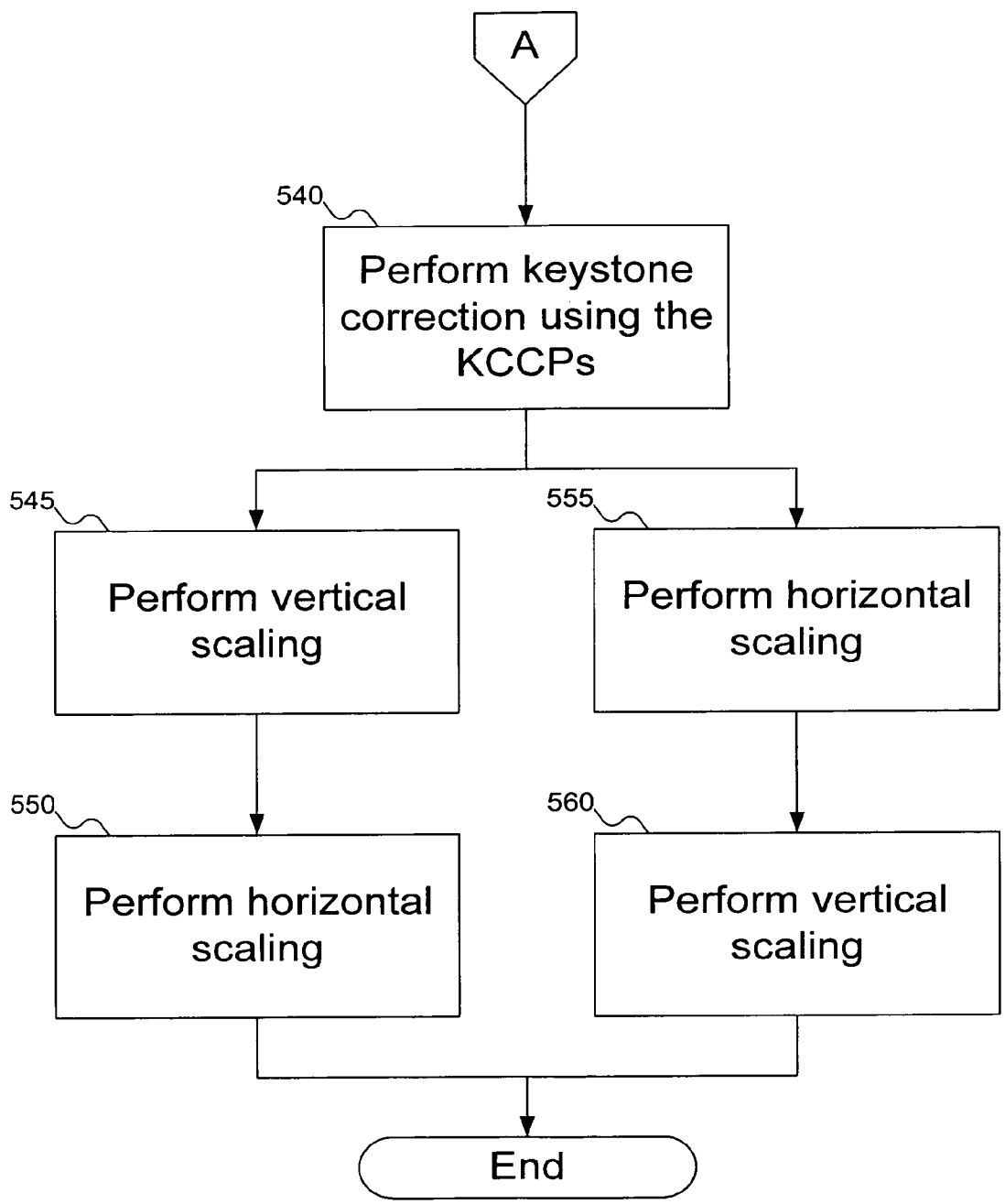

FIGS. 5A–5B show a flowchart of the procedure for performing keystone correction for the projector of FIG. 1, according to an embodiment of the invention. In FIG. 5A, at step 505, the inherent properties of the projector are determined. At step 510, the model of the projector is determined, so that the appropriate equation set can be applied. (In practice, the appropriate equation set is programmed in to the projector, so no actual determination is needed.) At step 515, the vertical tilt angle βv is determined. At step 520, the horizontal tilt angle βh is determined. If the horizontal tilt angle is affected by the vertical tilt angle, then at step 525 the horizontal tilt angle βh can be adjusted based on the vertical tilt angle βv. As shown by arrow 530, step 525 is optional, and can be omitted. At step 535, the projector computes the keystone correction corner points, using the formulae discussed above.

At step 540 (FIG. 5B), keystone correction is performed using the keystone correction corner points. This can be done generally in one of two ways. In one variation, at step 545 the image is scaled vertically, then at step 550 the image is scaled horizontally. In another variation, at step 555 the image is scaled horizontally, then at step 560 the image is scaled vertically.

The following discussion is intended to provide a brief, general description of a suitable machine (i.e., projector) in which certain aspects of the invention may be implemented. Typically, the machine includes a system bus to which is attached processors, memory, e.g., random access memory (RAM), read-only memory (ROM), or other state preserving medium, storage devices, a video interface, and input/output interface ports. The machine may be controlled, at least in part, by input from conventional input devices, such as keyboards, mice, etc., as well as by directives received from another machine, interaction with a virtual reality (VR) environment, biometric feedback, or other input signal.

The machine may include embedded controllers, such as programmable or non-programmable logic devices or arrays, Application Specific Integrated Circuits, embedded computers, smart cards, and the like. The machine may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciated that network communication may utilize various wired and/or wireless short range or long range carriers and protocols, including radio frequency (RF), satellite, microwave, Institute of Electrical and Electronics Engineers (IEEE) 802.11, Bluetooth, optical, infrared, cable, laser, etc.

The invention may be described by reference to or in conjunction with associated data including functions, procedures, data structures, application programs, etc. which when accessed by a machine results in the machine performing tasks or defining abstract data types or low-level hardware contexts. Associated data may be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Having described and illustrated the principles of the invention with reference to illustrated embodiments, it will be recognized that the illustrated embodiments may be modified in arrangement and detail without departing from such principles. And although the foregoing discussion has focused on particular embodiments, other configurations are contemplated. In particular, even though expressions such as "according to an embodiment of the invention" or the like are used herein, these phrases are meant to generally reference embodiment possibilities, and are not intended to limit the invention to particular embodiment configurations. As used herein, these terms may reference the same or different embodiments that are combinable into other embodiments.

Consequently, in view of the wide variety of permutations to the embodiments described herein, this detailed description and accompanying material is intended to be illustrative only, and should not be taken as limiting the scope of the invention. What is claimed as the invention, therefore, is all such modifications as may come within the scope and spirit of the following claims and equivalents thereto.

The invention claimed is:

1. An apparatus, comprising:
   an image projector to project an image;
   a set of inherent parameters including a horizontal resolution $Wn_0$, a vertical resolution $Hn_0$, a depth d, and a vertical offset db;
   a receiver to receive a vertical tilt angle $\beta v$ and a horizontal tilt angle $\beta h$ and including an adjuster to adjust the horizontal tilt angle $\beta h$ based on the vertical tilt angle $\beta v$; and
   a corrector to compute keystone correction corner points for the image using the set of inherent parameters, the vertical tilt angle $\beta v$, and the horizontal tilt angle $\beta h$.

2. A projector according to claim 1, wherein the receiver is operative to receive the vertical tilt angle $\beta v$ and the horizontal tilt angle $\beta h$ from a user.

3. A projector according to claim 1, wherein the receiver is operative to determine the vertical tilt angle $\beta v$ and the horizontal tilt angle $\beta h$ relative to a surface.

4. A projector according to claim 1, wherein the corrector performs keystone correction on the image using the keystone correction corner points for the image.

5. A projector according to claim 4, wherein the corrector includes means to deform the image according to the keystone correction corner points so that the deformed image, when projected, appears undeformed.

6. A projector according to claim 4, wherein the corrector applies vertical scaling followed by horizontal scaling to the image to perform keystone correction.

7. A projector according to claim 4, wherein the corrector applies horizontal scaling followed by vertical scaling to the image to perform keystone correction.

8. A projector, comprising:
   means for projecting an image;
   means for determining a set of inherent parameters including a horizontal resolution $Wn_0$, a vertical resolution $Hn_0$, a depth d, and a vertical offset db;
   means for receiving a vertical tilt angle $\beta v$ and a horizontal tilt angle $\beta h$;
   means for adjusting the horizontal tilt angle $\beta h$ based on the vertical tilt angle $\beta v$; and
   means for computing keystone correction corner points for the image using the set of inherent parameters, the vertical tilt angle $\beta v$, and the horizontal tilt angle $\beta h$.

9. A projector according to claim 8, wherein the means for receiving a vertical tilt angle $\beta v$ and a horizontal tilt angle $\beta h$ includes means for receiving the vertical tilt angle $\beta v$ and the horizontal tilt angle $\beta h$ from a user.

10. A projector according to claim 8, wherein the means for receiving a vertical tilt angle $\beta v$ and a horizontal tilt angle $\beta h$ includes means for determining the vertical tilt angle $\beta v$ and the horizontal tilt angle $\beta h$ relative to a surface.

11. A projector according to claim 8, further comprising means for performing keystone correction to the image using the keystone correction corner points for the image.

12. A projector according to claim 11, wherein the means for performing keystone correction includes means to deform the image according to the keystone correction corner points so that the deformed image, when projected, appears undeformed.

13. A projector according to claim 11, wherein the means for performing keystone correction includes means for performing vertical scaling followed by horizontal scaling to the image to perform keystone correction.

14. A projector according to claim 11, wherein the means for performing keystone correction includes means for performing horizontal scaling followed by vertical scaling to the image to perform keystone correction.

15. A method for performing keystone correction in a projector, comprising:
    determining a set of inherent parameters for the projector, the set of inherent parameters including a horizontal resolution $Wn_0$, a vertical resolution $Hn_0$, a depth d, and a vertical offset db;
    determining a vertical tilt angle $\beta v$;
    determining a horizontal tilt angle $\beta h$;
    adjusting the horizontal tilt angle $\beta h$ based on the vertical angle $\beta v$; and
    computing keystone correction corner points using the set of inherent parameters, the vertical tilt angle $\beta v$, and the horizontal tilt angle $\beta h$.

16. A method according to claim 15, further comprising performing keystone correction using the keystone correction corner points.

17. A method according to claim 16, wherein performing keystone correction includes deforming an image using the keystone correction corner points so that the deformed image, when projected, appears undeformed.

18. A method according to claim 16, wherein performing keystone correction includes performing vertical scaling followed by horizontal scaling.

19. A method according to claim 16, wherein performing keystone correction includes performing horizontal scaling followed by vertical scaling.

20. A method according to claim 15, wherein determining a vertical tilt angle $\beta v$ includes receiving the vertical tilt angle $\beta v$ as an input from a user.

21. A method according to claim 15, wherein determining a horizontal tilt angle $\beta h$ includes receiving the horizontal tilt angle $\beta h$ as an input from a user.

22. An article comprising a machine-accessible media having associated data, wherein the data, when accessed, results in a machine performing:
    determining a set of inherent parameters for the projector, the set of inherent parameters including a horizontal resolution $Wn_0$, a vertical resolution $Hn_0$, a depth d, and a vertical offset db;
    determining a vertical tilt angle $\beta v$;

determining a horizontal tilt angle $\beta h$;

adjusting the horizontal tilt angle $\beta h$ based on the vertical tilt angle $\beta v$; and computing keystone correction corner points using the set of inherent parameters, the vertical tilt angle $\beta v$, and the horizontal tilt angle $\beta h$.

23. An article according to claim 22, the machine-accessible data further including associated data that, when accessed, results in performing keystone correction using the keystone correction corner points.

24. An article according to claim 23, wherein performing keystone correction includes deforming an image using the keystone correction corner points so that the deformed image, when projected, appears undeformed.

25. An article according to claim 23, wherein performing keystone correction includes performing vertical scaling followed by horizontal scaling.

26. An article according to claim 23, wherein performing keystone correction includes performing horizontal scaling followed by vertical scaling.

27. An article according to claim 22, wherein determining a vertical tilt angle $\beta v$ includes receiving the vertical tilt angle $\beta v$ as an input from a user.

28. An article according to claim 22, wherein determining a horizontal tilt angle $\beta h$ includes receiving the horizontal tilt angle $\beta h$ as an input from a user.

* * * * *

UNITED STATES PATENT AND TRADEMARK OFFICE
CERTIFICATE OF CORRECTION

PATENT NO. : 7,175,286 B1 Page 1 of 1
APPLICATION NO. : 11/291161
DATED : February 13, 2007
INVENTOR(S) : Zhongde Wang et al.

It is certified that error appears in the above-identified patent and that said Letters Patent is hereby corrected as shown below:

In column 8, line 37, claim 15, the phrase "based on the vertical angle" should read -- based on the vertical tilt angle --.

Signed and Sealed this

Twenty-fourth Day of June, 2008

JON W. DUDAS
*Director of the United States Patent and Trademark Office*